(12) United States Patent  
Sutardja et al.

(10) Patent No.: US 8,693,300 B1  
(45) Date of Patent: Apr. 8, 2014

(54) WRITE PLL FOR OPTICAL DISC LABELING APPLICATIONS

(75) Inventors: Pantas Sutardja, Los Gatos, CA (US); Christopher Painter, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 57 days.

(21) Appl. No.: 13/208,047

(22) Filed: Aug. 11, 2011

Related U.S. Application Data

(60) Provisional application No. 61/375,519, filed on Aug. 20, 2010.

(51) Int. Cl.  
*G11B 7/00* (2006.01)

(52) U.S. Cl.  
USPC .......................................... 369/100; 347/249

(58) Field of Classification Search  
USPC .......................................... 369/100; 347/249  
See application file for complete search history.

(56) References Cited

U.S. PATENT DOCUMENTS

| | | | | |
|---|---|---|---|---|
| 5,535,067 | A * | 7/1996 | Rooke | 360/51 |
| 7,283,148 | B2 * | 10/2007 | Pettigrew | 347/224 |
| 7,414,643 | B2 * | 8/2008 | Bahng | 347/224 |
| 7,466,637 | B2 * | 12/2008 | Morishima | 369/47.4 |
| 7,497,534 | B2 * | 3/2009 | Struk et al. | 347/2 |
| 7,675,703 | B2 * | 3/2010 | Albrecht et al. | 360/51 |
| 7,681,964 | B2 * | 3/2010 | Ando et al. | 347/2 |
| 7,760,221 | B2 * | 7/2010 | Itoga et al. | 347/224 |
| 2001/0028612 | A1 * | 10/2001 | Klausberger et al. | 369/44.23 |
| 2005/0265145 | A1 * | 12/2005 | Nakane et al. | 369/44.27 |
| 2005/0265210 | A1 * | 12/2005 | Nakane et al. | 369/275.1 |
| 2006/0114759 | A1 * | 6/2006 | Hanks et al. | 369/30.01 |
| 2007/0024694 | A1 * | 2/2007 | Hanks et al. | 347/218 |
| 2009/0196131 | A1 * | 8/2009 | Chen | 369/44.11 |
| 2010/0008197 | A1 * | 1/2010 | Ikemoto et al. | 369/47.15 |
| 2010/0202264 | A1 * | 8/2010 | Han | 369/53.12 |
| 2011/0299376 | A1 * | 12/2011 | Ouchida et al. | 369/100 |

* cited by examiner

*Primary Examiner* — Brenda Bernardi (57) ABSTRACT

A system includes a position detection module configured to detect at least a first position indicator and a second position indicator corresponding to a label side of an optical disc. A write clock adjustment module is configured to determine a number of cycles of a write clock that occur between the first position indicator and the second position indicator, determine a difference between the number of cycles of the write clock and a desired number of cycles of the write clock, and adjust a frequency of the write clock based on the difference.

19 Claims, 5 Drawing Sheets

WRITE PLL FOR OPTICAL DISC LABELING APPLICATIONS

CROSS-REFERENCE TO RELATED APPLICATIONS

This application claims the benefit of U.S. Provisional Application No. 61/375,519, filed on Aug. 20, 2010. The disclosure of the above application is incorporated herein by reference in its entirety.

FIELD

The present disclosure relates to controlling a write clock for writing label data to a label side of an optical disc.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Optical discs (e.g. recordable and rewriteable CDs, DVDs, and/or Blu-ray discs) may include a data side and a non-data side. User data is written to and read from the data side of the disc. Conversely, a label may be applied to the non-data (e.g., label) side of the disc. For example only, a pre-printed label may be applied to the disc, or a printer may print directly onto a label that is already affixed to the disc.

In an optical drive that writes data to recordable and/or rewriteable discs, the optical drive may be configured to write label data directly to the label side of the disc. For example, the optical drive controls a laser to write data to the data side of the disc. The optical drive may use the same laser to write the label to the label side of the disc. The optical drive may modify operating parameters of the laser based on whether the laser is writing to the data side or the label side of the disc.

SUMMARY

A system includes a position detection module configured to detect at least a first position indicator and a second position indicator corresponding to a label side of an optical disc. A write clock adjustment module is configured to determine a number of cycles of a write clock that occur between the first position indicator and the second position indicator, determine a difference between the number of cycles of the write clock and a desired number of cycles of the write clock, and adjust a frequency of the write clock based on the difference.

In other features, the position detection module is configured to generate a first timestamp based on the first position indicator and a second timestamp based on the second position indicator, and the write clock adjustment module is configured to determine the number of cycles of the write clock that occur between the first position indicator and the second position indicator based on the first timestamp and the second timestamp. The position detection module is configured to count the number of cycles of the write clock that occur between the first position indicator and the second position indicator.

In other features, the write clock adjustment module is configured to generate a frequency correction control signal based on the difference. A write clock generation module is configured to generate the write clock based on the difference. A write control module is configured to write pixel data to the label side of the optical disc based on the write clock. The position detection module is configured to count a number of cycles of the write clock that occur during a revolution of the optical disc. A write control module is configured to begin writing pixel data to the label side of the optical disc based on the number of cycles of the write clock that occur during a revolution of the optical disc. The write control module is configured to begin writing the pixel data based on a comparison between the number of cycles of the write clock that occur during a revolution of the optical disc and a value corresponding to an angle 0 position of the optical disc.

In other features, a reference generator module is configured to generate the desired number of cycles based on a desired number of cycles of the write clock occurring between the first position indicator and the second position indicator. A reference generator module configured to generate a counter profile indicative of the desired number and a phase. The write clock adjustment module is configured to determine a relationship between an angular position of the optical disc and the phase of the counter profile based on the first position indicator and the second position indicator.

A method includes detecting at least a first position indicator and a second position indicator corresponding to a label side of an optical disc, determining a number of cycles of a write clock that occur between the first position indicator and the second position indicator, determining a difference between the number of cycles of the write clock and a desired number of cycles of the write clock; and adjusting a frequency of the write clock based on the difference.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In an optical drive configured to write label data directly to a label side of a disc, label data is read from memory and written to the disc using a laser. The laser is controlled according to a write clock to write a pixel or a group of pixels corresponding to the label data. A position of the laser is phase locked to a surface of the label side of the disc to ensure that each pixel is written properly. If the laser is not properly phase locked to the surface, an image written to the label may include undesirable visual artifacts.

The optical disc is controlled to rotate at a desired speed during the writing of the label data. Accordingly, a position of the laser relative to a given portion of the surface of the optical disc is known. However, various factors may affect an actual speed and position of the surface of the optical disc. Consequently, the position of the laser may not be phase locked to the surface of the optical disc, and some of the label data may be written improperly. Factors that may affect the actual speed and position of the optical disc include, but are not limited to, physical imperfections in the optical disc, speed variation due to torque ripple in a spindle motor, bearing imperfections, and radial run out. A write clock adjustment system according to the present disclosure implements a write phase-locked loop (PLL) to adjust a phase and/or frequency of the write clock to compensate for any undesirable variations in the speed and position of the optical disc.

Figure 1:
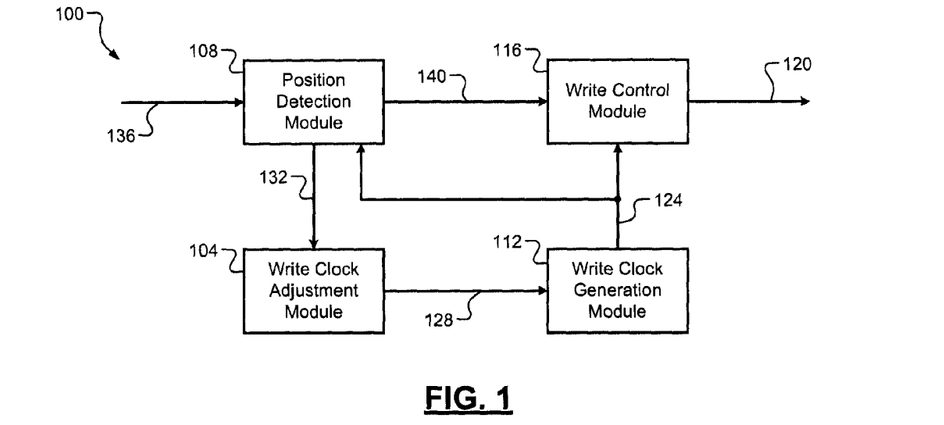
FIG. 1 is a functional block diagram of a write clock adjustment system according to the present disclosure.

Referring now to FIG. 1, a write clock adjustment system 100 includes a write clock adjustment module 104, a position detection module 108, a write clock generation module 112, and a write control module 116. The write control module 116 outputs a control signal 120 to control writing of data to a disc. The write control module 116 outputs the control signal 120 to, for example only, a laser diode driver (not shown) to write data to a data side of the disc and to write label data to a label side of the disc. The write control module 116 outputs the control signal 120 according to a write clock 124. For example only, during writing of the label, reading of pixel data from memory as well as power modulation of a write laser associated with the laser diode driver are controlled based on the write clock 124. The write clock generation module 112 generates and outputs the write clock 124.

The write clock adjustment module 104 outputs a write clock adjustment signal 128 to adjust the write clock 124. For example only, the write clock adjustment signal 128 adjusts a frequency and/or a phase of the write clock 124. The write clock adjustment signal 128 may correspond to a frequency correction. The write clock generation module 112 applies the frequency correction to the write clock 124 in response to the write clock adjustment signal 128.

The write clock adjustment module 104 generates the write clock adjustment signal 128 based on one or more position detection signals 132 received from the position detection module 108. For example only, the position detection module 108 may detect a position of the disc and/or a spindle based on one or more external sensor signals 136, and output the position detection signals 132 accordingly. Further, the position detection module 108 may output a disc angle index 140 based on the external sensor signals 136. The disc angle index 140 indicates an angle 0 position of the optical disc. For example, the optical disc may include an index marker that indicates the angle 0 position.

Tracks on the data side of optical discs of various formats may include a land/groove structure. Sidewalls of the land/groove structure include an intentional wobble, which correspond to a detectable wobble signal. Timing information (e.g., phase error) can be extracted from the wobble signal to adjust the write clock 124 during writing to the data side of the optical disc. Conversely, while writing label data to the label side of the optical disc (i.e., the optical disc is flipped over within an optical disc drive), the wobble signal is not detectable.

Figure 2:
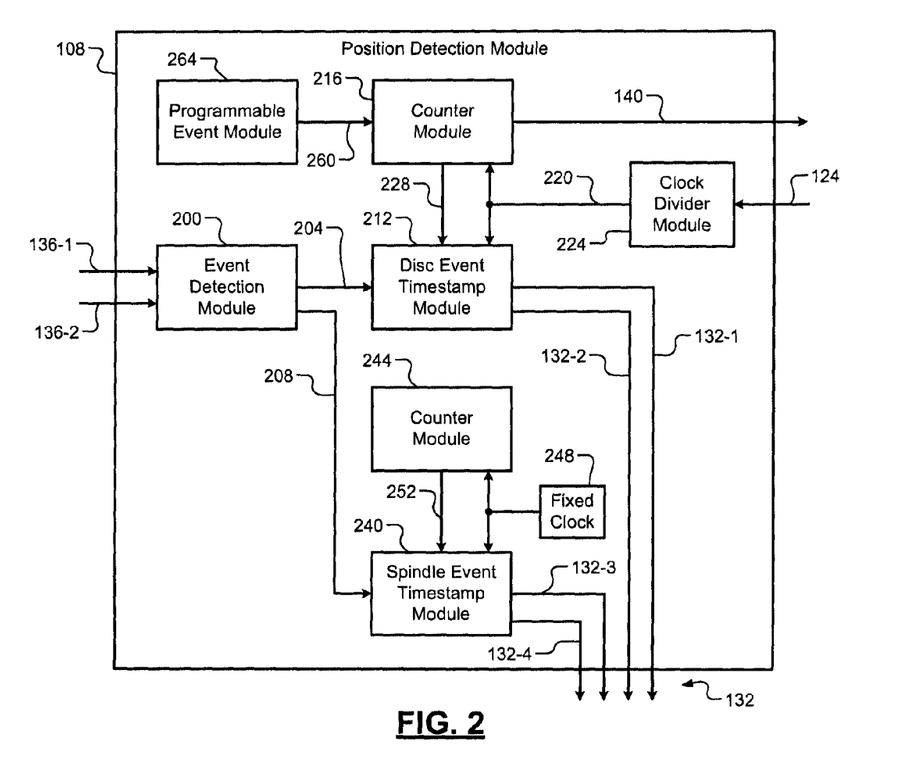
FIG. 2 is a functional block diagram of a position detection module according to the present disclosure.

Referring now to FIG. 2, the position detection module 108 outputs the position detection signals 132 based on the sensor signals 136 while writing to the label side of the optical disc. One or more external sensors (not shown) generate the sensor signals 136 according to detectable position indicators (i.e., detectable events) of an angular position of the optical disc during rotation. The sensor signals 136 may include a predetermined number of evenly-spaced pulses per revolution of the optical disc. For example only, one of the sensor signals 136 may include one pulse per degree of rotation of the optical disc, resulting in 360 pulses in a single revolution. As a second example, one of the sensor signals 136 may include one pulse per 20 degrees of rotation of the optical disc, resulting in 18 pulses in a single revolution.

The sensor signals 136 include a disc event sensor signal 136-1 and a spindle event sensor signal 136-2. In the disc event sensor signal 136-1, the pulses are a response to sensed position indicators on the label side of the optical disc, and each pulse corresponds to a disc event. For example only, the disc events correspond to position indicators formed on the label side of the optical disc that are detectable by an external sensor. Conversely, in the spindle event sensor signal 136-2, the pulses are a response to indicators of spindle rotation, and each pulse corresponds to a spindle event. For example only, the spindle events correspond to Hall effect sensor outputs from a spindle motor driver and/or a commutation state of the spindle motor. Other suitable detectable indicators of optical disc position may be implemented. For example only, in both the disc event sensor signal 136-1 and the spindle event sensor signal 136-2, the pulses may be a response to indicators of spindle rotation, each pulse corresponding to a spindle event. In this case, the disc position can be inferred from the spindle position.

Figure 3:
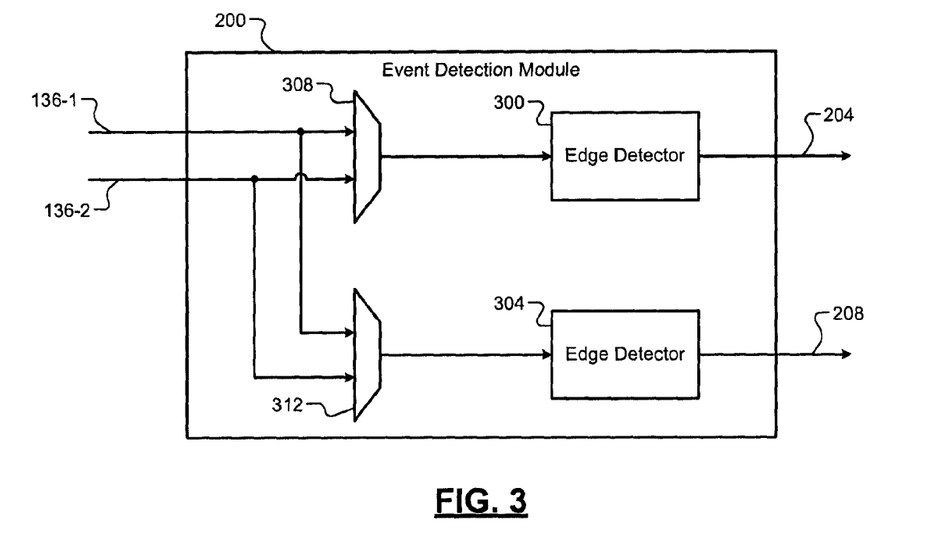
FIG. 3 is a functional block diagram of an event detection module according to the present disclosure.

An event detection module 200 receives the sensor signals 136 and outputs a disc event detection signal 204 and a spindle event detection signal 208 according to the sensor signals 136. For example only, the event detection module 200 outputs the disc event detection signal 204 in response to detecting the pulses of the disc event sensor signal 136-1. Conversely, the event detection module 200 outputs the spindle event detection signal 208 in response to detecting the pulses of the spindle event sensor signal 136-2. It should be understood that either the disc event signal 136-1 or the spindle event signal 136-2 can result in the disc event detection signal 204 according to the configuration of the multiplexer 308.

A disc event timestamp module 212 receives the disc event detection signal 204 and communicates with a counter module 216. For each disc event detected via the disc event detection signal 204, the disc event timestamp module 212 generates a disc event timestamp and a disc event interrupt. The disc event timestamp and the disc event interrupt are provided via disc event timestamp signal 132-1 and disc event interrupt signal 132-2, respectively. Each of the disc event timestamp module 212 and the counter module 216 are driven by a divided clock 220, which corresponds to the write clock 124 divided by a clock divider module 224. Those skilled in the art can appreciate that the write clock 124 could also be provided directly to the disc event timestamp module 212 and the counter module 216. The write clock 124 is generated according to a digital PLL. The digital PLL is controlled according to an analog PLL, which functions as a timebase generator for the digital PLL.

The counter module 216 counts pulses (i.e., cycles) of the divided clock 220 and provides a corresponding counter value 228 to the disc event timestamp module 212. Accordingly, at each disc event timestamp, the disc event timestamp module 212 may also store and/or provide the current counter value 228 of the counter module 216 via the disc event timestamp signal 132-1. The counter value 228 of the counter module 216 is indicative of a frequency of the write clock 124 and the disc event timestamps are indicative of a frequency of the disc event detection signal 204. Accordingly, the counter value 228 and the disc event timestamps are indicative of a relationship between the frequency of the write clock 124 and a rotational speed of the optical disc.

For example, a first disc event timestamp may be provided with a corresponding first counter value. A second (e.g., immediately following) disc event timestamp is provided with a corresponding second counter value. Accordingly, a difference between the first counter value and the second counter value corresponds to a number of the pulses of the divided clock 220 (and therefore the write clock 124) occurring between the first disc event timestamp and the second disc event timestamp. Similarly, the difference between the first disc event timestamp and the second disc event timestamp corresponds to a period between detected disc events. Therefore, a number of pulses of the write clock 124 between consecutive disc event timestamps can be determined.

Because a spacing between the disc events on the optical disc and a number of disc events in one revolution of the optical disc are known, the number of the pulses of the write clock 124 occurring between consecutive disc events is indicative of the rotational speed of the optical disc. As such, the write clock 124 can be controlled such that a desired number of pulses of the write clock 124 occur between consecutive disc events despite instantaneous, uncontrolled changes in the rotational speed of the optical disc. In other words, if the number of the pulses exceeds the desired amount, the speed (i.e., frequency) of the write clock 124 may be too high with respect to the current rotational speed of the optical disc and can be decreased. Conversely, if the number of the pulses is less than the desired amount, the speed of the write clock 124 may be too low with respect to the current rotational speed of the optical disc and can be increased. The counter 216 "wraps," or resets, when the counter value 228 reaches a maximum value that corresponds to the number of disc events in one revolution of the optical disc.

A spindle event timestamp module 240 receives the spindle event detection signal 208 and communicates with a counter module 244. For each spindle event detected via the spindle event detection signal 208, the spindle event timestamp module 240 generates a spindle event timestamp and a spindle event interrupt. The spindle event timestamp and the spindle event interrupt are provided via spindle event timestamp signal 132-3 and spindle event interrupt signal 132-4, respectively. Each of the spindle event timestamp module 240 and the counter module 244 are driven by a fixed clock 248. The fixed clock 248 is generated according to a fixed frequency reference (e.g., a fixed frequency reference derived from a quartz crystal, a ceramic resonator, or other stable clock source), which also controls spindle rotation. The counter module 244 counts pulses of the fixed clock 248 and provides a corresponding counter value 252 to the spindle event timestamp module 240. The spindle event timestamp module 240 may provide the counter value 252 via the spindle event timestamp signal 132-3. Accordingly, a relationship between the spindle events and the fixed clock 248 can be determined based on the spindle event timestamp signal 132-3.

The counter module 216 receives an event modulus 260 from a programmable event module 264. For example, the event module 264 may be programmed with the event modulus 260, which represents the wrap value of the counter module 216. In other words, the event modulus 260 corresponds to the number of disc events in one revolution of the optical disc. Accordingly, the counter module 216 resets when the counter value 228 reaches the maximum value indicated by the event modulus 252. The disc angle index 140 corresponds to the counter value 228.

Referring now to FIG. 3, the event detection module 200 includes edge detectors 300 and 304 and multiplexers 308 and 312. Each of the multiplexers 308 and 312 receives both the disc event sensor signal 136-1 and the spindle event sensor signal 136-2, and selectively outputs one of the disc event sensor signal 136-1 and the spindle event sensor signal 136-2. The edge detectors 300 and 304 output the disc event detection signal 204 and the spindle event detection signal 208, respectively, based on detected edges (e.g., corresponding to detected events) in the signals received from the multiplexers 308 and 312. Accordingly, each of the edge detectors 300 and 304 may be responsive to either of the sensor signals 136. In this manner, the event detection module 200 and the position detection module 108 are adaptable to be responsive to either or both of the sensor signals 136. For example, if the label side of the optical disc is not configured to include detectable disc events, the position detection module 108 may still generate the position detection signals 132 based on detectable spindle events instead of disc events.

Figure 4:
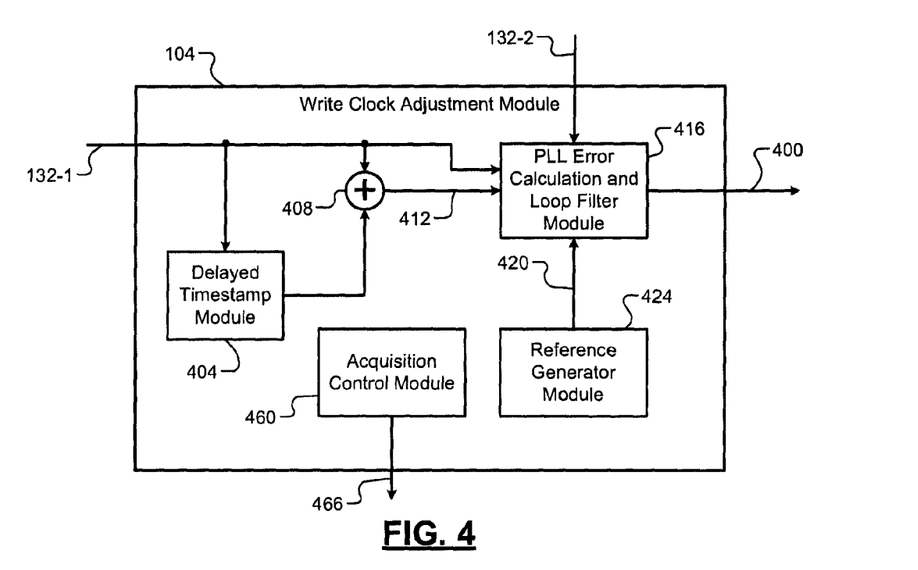
FIG. 4 is a functional block diagram of a write clock adjustment module according to the present disclosure.

Referring now to FIG. 4, the write clock adjustment module 104 receives the position detection signals 132 from the position detection module 108 and determines a frequency correction control signal 400 based on the position detection signals 132. As shown, the write clock adjustment module 104 determines the frequency correction control signal 400 based on the disc event timestamp signal 132-1 (including the counter value 228 and the disc event timestamps) and the disc event interrupt signal 132-2. However, the write clock adjustment module 104 may also use the spindle event timestamp signal 132-3 and/or the spindle event interrupt signal 132-4.

A delayed timestamp module 404 delays a previous disc event timestamp and provides the delayed disc event timestamp to a summing module 408. The summing module 408 receives the delayed disc event timestamp and a current disc event timestamp and outputs a difference between the delayed disc event timestamp and the current disc event timestamp. Accordingly, the output of the summing module 408 corresponds to a time 412 between consecutive disc event timestamps.

A PLL error calculation and loop filter module 416 receives the disc event timestamp signal 132-1 (e.g., indicative of a phase of the disc event detection signal 204), the disc event interrupt signal 132-2, and the time 412 (e.g., is indicative of the frequency of the disc event detection signal 204) and determines the relationship between the frequency of the write clock 124 and the rotational speed of the optical disc as described above with respect to FIG. 2. For example, based on a difference between consecutive counter values and the time 412 between consecutive disc event timestamps, the PLL error calculation and loop filter module 416 determines a relative frequency of the write clock 124. The PLL error calculation and loop filter module 416 may determine the frequency of the write clock 124 (e.g., as indicated by a counter profile) each time the disc event interrupt signal 132-2 indicates a disc event interrupt. If the counter 216 resets (i.e., wraps) in between consecutive disc event timestamps, the PLL error calculation and loop filter module 416 may "unwrap" the consecutive counter values to determine the number of pulses of the write clock 124 between consecutive disc event timestamps.

The PLL error calculation and loop filter module 416 receives a desired counter profile 420 from a reference generator module 424. The desired counter profile 420 corresponds to a desired number of pulses of the write clock 124 between consecutive disc event timestamps. For example only, the reference generator module 424 maintains the desired counter profile 420 according to a reference numerically controlled oscillator (NCO) such as a modulo integrator. The PLL error calculation and loop filter module 416 generates the frequency correction control signal 400 based on a difference between an actual counter profile (corresponding to the counter value 228 and the number of pulses of the write clock 124) and the desired counter profile 420. The PLL error calculation and loop filter module 416 may include a loop filter to post-process the frequency correction control signal 400. For example only, the loop filter may have a frequency path including an integrator and a phase path including a simple gain. For example only, the loop filter may, along with the other elements of the PLL, effect a Type 1 loop with respect to phases disturbances and a Type 0 loop with respect to frequency disturbances.

The write clock generation module 112 adjusts a frequency of the write clock 124 based on the frequency correction control signal 400. Accordingly, the frequency correction control signal 400 drives the actual counter profile (and therefore the frequency of the write clock 124) toward the desired counter profile 420. Because the write clock adjustment module 104 receives the disc event timestamp and a corresponding disc event interrupt with each disc event, the write clock adjustment module 104 may generate the frequency correction control signal 400 at every disc event to continually adjust the write clock 124.

The reference generator module 424 may reset the desired counter profile 420 to correspond to the current counter value 228 of the counter module 216. For example, while the write clock adjustment module 104 adjusts the frequency of the write clock 124 based on the desired counter profile 420, the current counter value 228 of the counter module 216 may be out of phase with the desired counter profile 420. Accordingly, after the write clock adjustment module 104 outputs the appropriate frequency correction control signal 400 to lock the frequency of the write clock 124 to the desired counter profile, the reference generator module 424 resets the desired counter profile 420 to match the phase of the counter module 216. For example, when the current counter value 228 of the counter module 216 is 0, the reference module 424 resets the desired counter profile 420 to 0. In this manner, the phase of the desired counter profile 420 provided to the PLL error calculation and loop filter module 416 will, in this instant, match the phase of the current counter value 228 of the counter module 216. As the PLL continues to run, it will eliminate, or reduce to an acceptable level, any new frequency and phase errors introduced by irregularities in the disc motion.

Pixel data, which corresponds to data to be written to the label side of the optical disc, is read out from memory based on the write clock 124. Further, the power of a laser used to write the pixel data to the label is modulated based on the write clock 124 and on the pixel data itself. The write control module 116 writes the pixel data according to the counter value 228 and the write clock 124. For example, the write clock adjustment system 100 may include an acquisition control module 460 that determines the angle 0 position of the optical disc using any suitable method, which may depend on the disc labeling scheme of a particular optical disc. Alternatively, the acquisition control module 460 may receive the angle 0 position from another component of the write clock adjustment system 100.

Once the angle 0 position is known, the acquisition control module 460 determines an angle 0 counter value 466 of the counter module 216 that corresponds to the angle 0 position. The acquisition control module 460 provides the angle 0 counter value 466 to the write control module 116. Accordingly, the write control module 116 can compare the current counter value 228 with the angle 0 counter value 466 to determine when the optical disc is in the angle 0 position. For example, the write control module 116 may be configured to write pixel data to the label side of the optical disc beginning at the angle 0 position. For example only, a first memory address that stores the beginning of the pixel data may correspond to the angle 0 position. When the angle 0 counter value 466 is known, the write control module 116 can begin writing the pixel data at the desired time. In other words, the pixel data is phase locked to the label side of the optical disc.

Figure 5A:
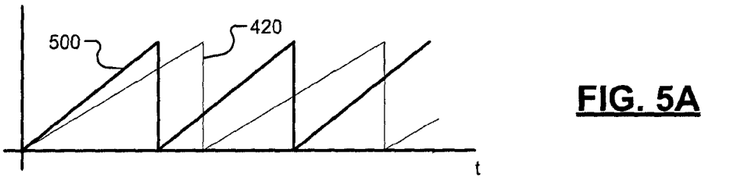
FIGS. 5A, 5B, and 5C illustrate a comparison between an actual counter profile and a desired counter profile according to the present disclosure.
Figure 5B:
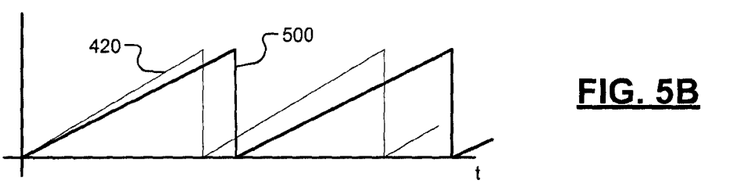
Figure 5C:
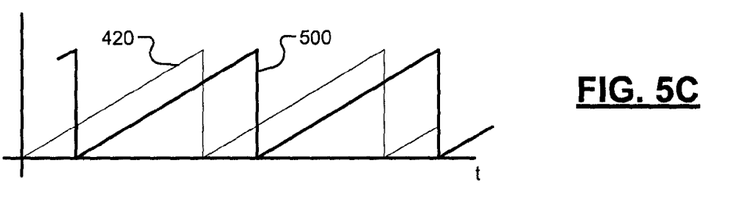

Referring now to FIGS. 5A, 5B, and 5C, comparisons between an actual counter profile 500 and the desired counter profile 420 are shown, where counter values correspond to the respective phases of the profiles 500 and 420, and slopes of the profiles 500 and 420 correspond to the respective frequencies of the profiles 500 and 420. Each sawtooth cycle of the profiles 500 and 420 corresponds to a counter value ramping from 0 to a maximum counter value. For label writing purposes, the phase corresponds to an angular position around the optical disc relative to a predetermined position (e.g., the angle 0 position) on the optical disc.

In FIG. 5A, the frequency of the write clock 124 is too high with respect to the current rotational speed of the optical disc. Accordingly, a frequency of the actual counter profile 500 is greater than a frequency of the desired counter profile 420.

Conversely, in FIG. 5B, the frequency of the write clock 124 is too low with respect to the current rotational speed of the optical disc. Accordingly, the frequency of the actual counter profile 500 is less than the frequency of the desired counter profile 420. In FIG. 5C, the frequency of the actual counter profile 500 is matched to the frequency of the desired counter profile 420. However, the actual counter profile 500 is out of phase with the desired counter profile 420. Accordingly, the reference generator module 424 resets the desired counter profile 420 to match the phase of the desired counter profile 420 to the actual counter profile 500.

Accordingly, as described in FIGS. 1-5, when an optical disc is inserted for label writing, the write clock adjustment system 100 determines the frequency correction control signal 400 according to the time between disc event timestamps and a number of cycles of the write clock 124 between the disc event timestamps. The frequency correction control signal 400 adjusts the write clock 124 to correspond to the rotational speed of the optical disc (i.e., frequency lock is obtained). When the difference between the actual counter profile 500 and the desired counter profile 420 is less than a threshold (for example only, a threshold corresponding to a frequency error of 1%), the write clock adjustment system 100 adjusts the phase of the desired counter profile 420 to correspond to the phase of the actual counter profile 500 (i.e., phase lock is obtained). The write clock adjustment system 100 determines an angle 0 position of the optical disc such that label data may be written according to an appropriate phase and frequency of the write clock 124 and according to the angle 0 position.

Figure 6:
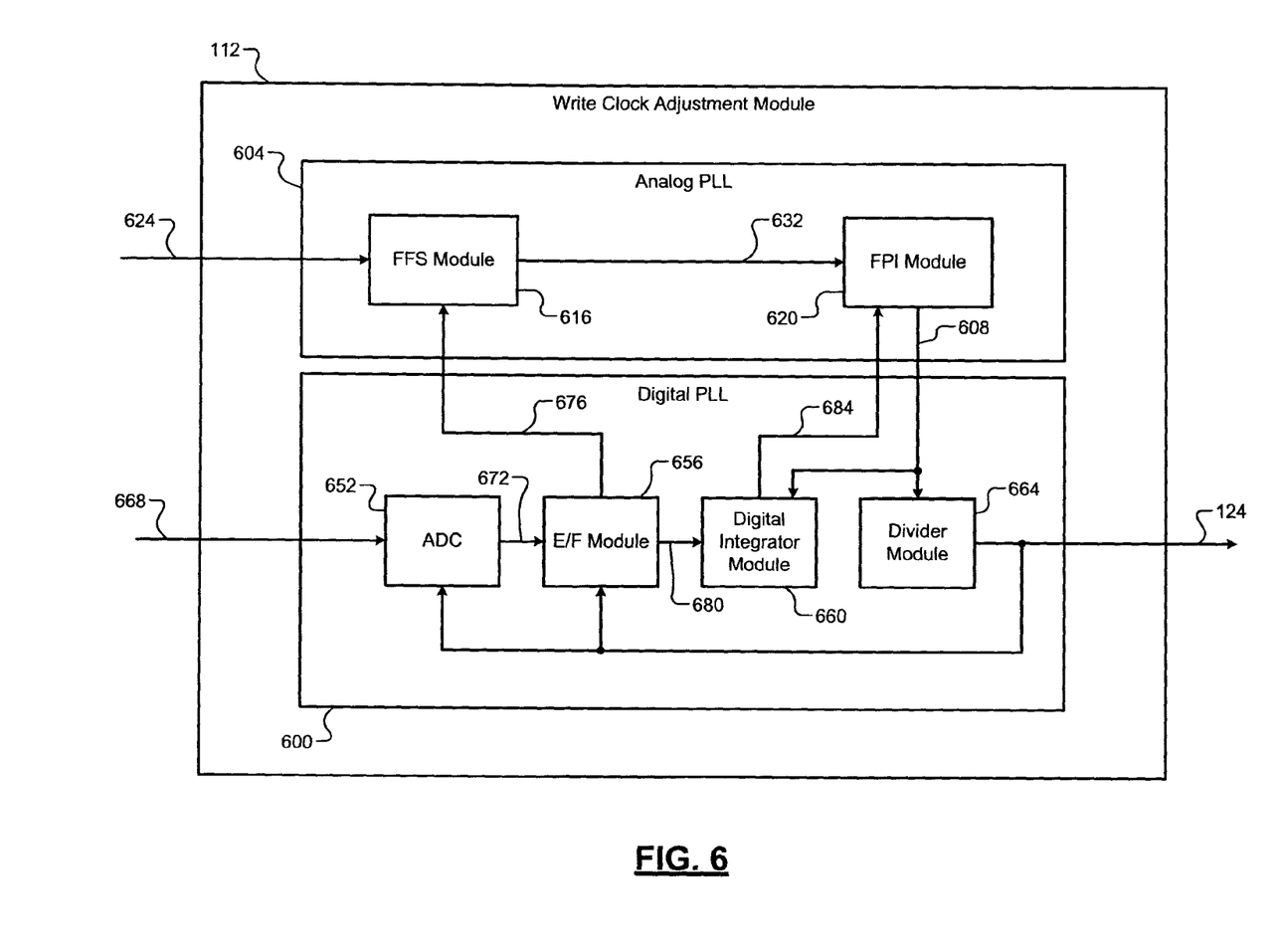
FIG. 6 is a functional block diagram of a write clock generation module according to the present disclosure.

Referring now to FIG. 6, an example of a write clock generation module 112 includes a digital PLL 600 and an analog PLL 604. The analog PLL 604 functions as a timebase generator (i.e., a reference frequency) for the digital PLL 600. The digital PLL 600 outputs the write clock 124 according to an analog PLL output 608. The digital PLL 600 and the analog PLL 604 operate together to output the write clock 124 for reading data from the optical disc and writing data to the optical disc. During writing of label data to the label side of the optical disc, certain functions of selected components of the digital PLL 600 and the analog PLL 604 may be modified. More specifically, the write clock adjustment module 104 may replace or modify the functions of the selected components to adjust the write clock 124 during label writing. Accordingly, components of the write clock generation module 112 can be used for both data writing and label writing.

The analog PLL 604 includes a fractional frequency synthesizer (FFS) module 616 and a fine phase interpolator (FPI) module 620. It can be appreciated that the analog PLL 604 may include other components that are not shown to facilitate the description of the present disclosure. The FFS module 616 receives a reference clock 624. For example only, the reference clock 624 is received from a crystal oscillator (not shown). Accordingly, the FFS module 616 is frequency and phase locked to the crystal oscillator. For example only, the reference clock 624 may be up-synthesized to a higher frequency by the FFS module 616. As a further example, the reference clock 624 may also be down-synthesized to a lower frequency by the FFS module 616.

The FFS module 616 provides a voltage controlled oscillator (VCO) output 632 corresponding to multiple phases to the FPI module 620. The FPI module 620 provides the output 608 to the digital PLL 600. For example, the FPI module 620 performs fine phase interpolation on the VCO output 632 to generate the output 608. The write clock 124 is clocked according to the output 608 of the analog PLL 604. Accordingly, the analog PLL 604 functions as a "coarse" PLL and the digital PLL 600 functions as a "fine" PLL.

For example only, the digital PLL 600 includes an analog to digital converter (ADC) module 652, an error/filter (E/F) module 656, a digital integrator module 660 implementing an NCO, and a programmable divider module 664. During data writing, the ADC module 652 receives analog data 668 and the write clock 124 and outputs digital data 672 accordingly. The E/F module 656 detects and corrects phase and frequency errors of the write clock generation module 112 based on the digital data 672 and the write clock 124. For example, the E/F module 656 provides an increment/decrement (I/D) signal 676 to the FFS module 616 to adjust a frequency of the analog PLL 604. The E/F module 656 provides a phase adjustment signal 680 to the digital integrator module 660. The digital integrator module 660 outputs a phase control signal 684 based on the phase adjustment signal 680 and the output 608 of the analog PLL 604. The FPI module 620 performs the fine phase interpolation on the VCO output 632 to generate the output 608 further based on the feedback of the phase control signal 684. The divider module 664 divides the output 608 to generate the write clock 124.

Figure 7:
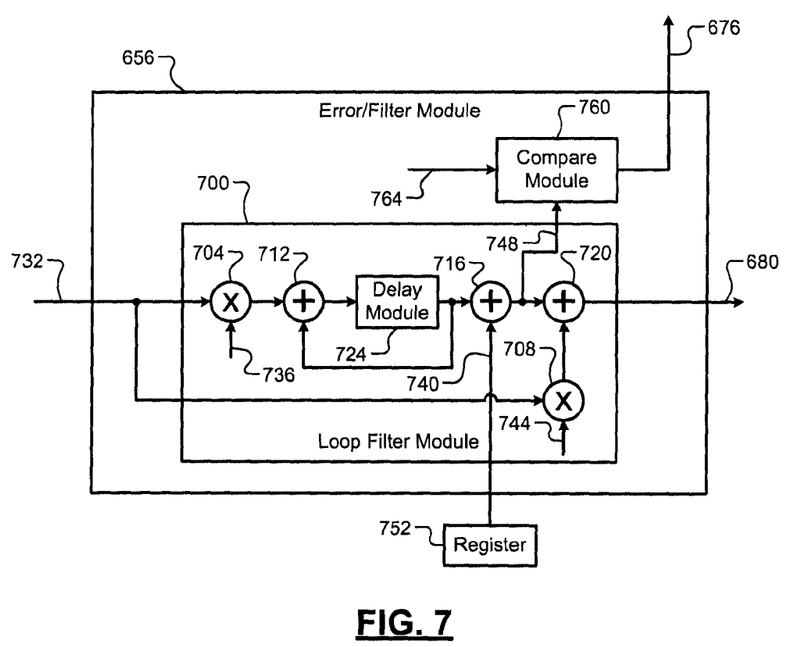
FIG. 7 is a functional block diagram of an error/filter module according to the present disclosure.

Referring now to FIG. 7, the E/F module 656 includes an example of a loop filter module 700. The loop filter module 700 includes multipliers 704 and 708, summers 712, 716, and 720, and delay module 724. The multiplier 704 multiplies a timing error 732 of the write clock 124 with a frequency gain 736. The summer 712 and the delay module 724 function as a frequency accumulator. An output of the delay module 724 is summed with a frequency offset 740. The multiplier 708 multiplies the timing error 732 and a phase gain 744. An output of the summer 716, which corresponds to an accumulated frequency 748, and the multiplier 708 are summed to provide the phase adjustment signal 680. For example only, the frequency offset 740 may correspond to a value stored in a register 752.

A compare module 760 receives the accumulated frequency 748 and one or more programmable thresholds 764. The compare module 760 outputs the I/D signal 676 based on the accumulated frequency 748 and the programmable thresholds 764. For example, the programmable thresholds 764 may include a positive value and a negative value. The I/D signal 676 is positive (i.e., commands an increase), negative (i.e., commands a decrease), or 0 based on whether the accumulated frequency 748 is outside of the positive value and the negative value. For example, if the accumulated frequency 748 is greater than the positive value, the I/D signal 676 commands a decrease. If the accumulated frequency 748 is less than the positive value, the I/D signal 676 commands a decrease. If the accumulated frequency 748 is between the positive value and the negative value, the I/D signal 676 is 0.

The analog PLL 604 (i.e., the frequency of the analog PLL 604) speeds up or slows down in response if the I/D signal 676 commands an increase or decrease, respectively, and maintains the current speed if the I/D signal 676 is 0. Accordingly, over time an average value of the accumulated frequency 748 is controlled between the positive value and the negative value, and the frequency of the analog PLL 604 is controlled to be within a desired frequency band. Any residual frequency and phase error may be corrected by the digital PLL 600 and the FPI module 620. For example only, the frequency gain 736, the frequency offset 740, and the phase gain 744 can be adjusted to correct any residual error in the write clock 124.

During label writing, a fixed clock generated by a separate FSS (not shown) similar to the FSS 616 controls the spindle (and therefore a spindle reference period). Because the spindle reference period is known, the digital PLL 600 controls the write clock 124 according to the known spindle reference period. However, the spindle reference period corresponds to a target spindle speed, and the actual spindle speed can vary with respect to the spindle reference period. Accordingly, the write clock adjustment system 100 adjusts the write clock 124 to more accurately correspond to the actual spindle speed.

More specifically, during label writing, the frequency gain 736 and the phase gain 744 can be set to 0, effectively disabling the loop filter module 700. Instead, the write clock adjustment module 104 provides the frequency correction control signal 400 as described above with respect to FIGS. 1-5. For example only, the frequency and phase errors calculated by the PLL error calculation and loop filter module 416 may be processed by a firmware-implemented loop filter (not shown) to determine the frequency correction control signal 400, which is then written to the register 752 after each disc event. In other words, the frequency correction control signal 400 computed by the PLL error calculation and loop filter module 416 may be written to the register 752 each time the write clock adjustment module 104 updates the frequency correction control signal 400 in response to the position detection signals 132. With the frequency gain 736 and the phase gain 744 set to 0, the frequency correction control signal 400 is the output of the loop filter module 700. Accordingly, the I/D signal 676 and the phase adjustment control signal 680 correspond to the frequency correction control signal 400 provided by the write clock adjustment module 104. In this manner, using the frequency correction control signal 400, the write clock adjustment module 104 adjusts the write clock 124 and the analog PLL 604 according to the actual rotational speed of the optical disc.

Figure 8:
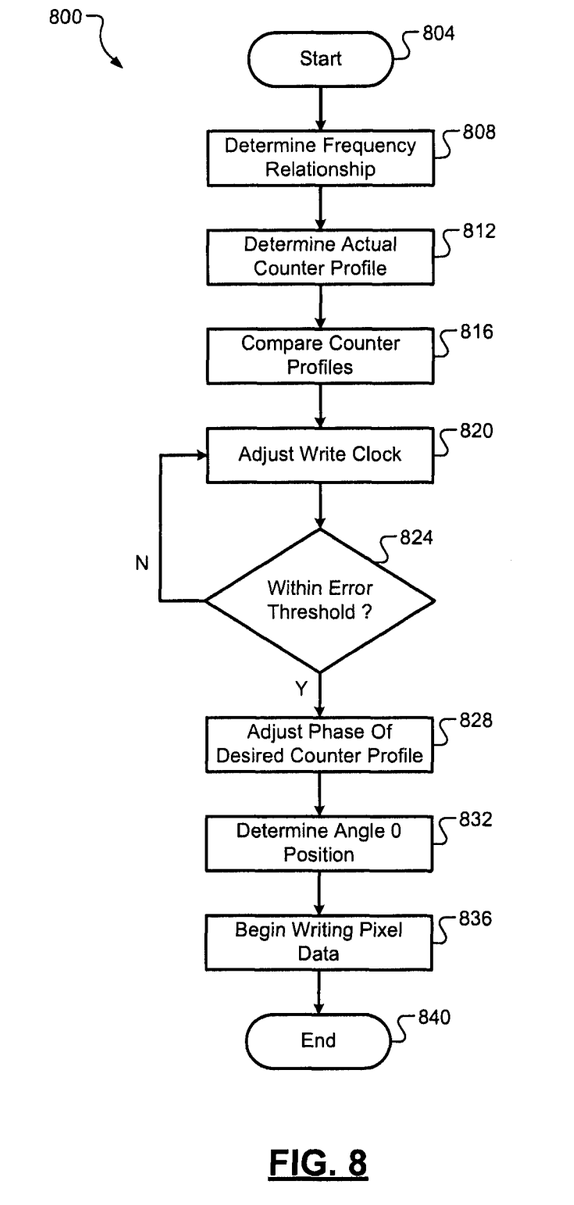
FIG. 8 illustrates a write clock adjustment method according to the present disclosure.

Referring now to FIG. 8, a write clock adjustment method 800 begins at 804. At 808, the method 800 determines a relationship between a frequency of a write clock and a rotational speed of an optical disc based on a number of pulses of the write clock that occur between consecutive disc event timestamps. For example, the relationship between the frequency of the write clock and the rotational speed of the optical disc may be based on a number of pulses of the write clock that occur between consecutive disc event timestamps. For example only, the method 800 determines the rotational speed of the optical disc based on a time between the disc event timestamps. A number of pulses of the write clock in between consecutive disc event timestamps is indicative of the frequency of the write clock. Accordingly, if the number of pulses is greater than a desired number of pulses, the frequency may be too high with respect to the rotational speed of the optical disc. Conversely, if the number of pulses is less than a desired number of pulses, the frequency may be too low with respect to the rotational speed of the optical disc.

At 812, the method 800 determines an actual counter profile associated with the number of pulses of the write clock, which is indicative of the frequency of the write clock. At 816, the method 800 compares the actual counter profile to a desired counter profile. At 820, the method 800 adjusts the write clock based on the comparison. At 824, the method 800 determines whether the actual counter profile is within an error threshold of the desired counter profile. If true, the method continues to 828. If false, the method 800 continues to 820. At 828, the method 800 adjusts a phase of the desired counter profile to match a phase of the actual counter profile. At 832, the method 800 determines an angle 0 position of the optical disc. At 836, the method 800 begins writing pixel data to the label side of the optical disc at the angle 0 position. When the method 800 is finished writing the pixel data, the method 800 ends at 840.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
   a position detection module configured to detect consecutive position indicators, wherein the consecutive position indicators include a plurality of position indicators corresponding to i) a label side of an optical disc, and ii) a single rotation of the optical disc;
   a write clock adjustment module configured to i) receive an indication of each of the consecutive position indicators, ii) determine a number of cycles of a write clock that occur between the consecutive position indicators, iii) determine a difference between the number of cycles of the write clock and a desired number of cycles of the write clock, wherein the desired number of cycles of the write clock corresponds to an expected rotational speed of the optical disc, and iv) adjust, every time an individual one of the consecutive position indicators in the single rotation of the optical disc is received, a frequency of the write clock based on the difference; and
   a reference generator module configured to generate a counter profile that increments to indicate the desired number of cycles of the write clock,
   wherein the write clock adjustment module is further configured to determine a relationship between an angular position of the optical disc and a phase of the counter profile based on the consecutive position indicators, and
   wherein the reference generator module is further configured to, based on the relationship between the angular position of the optical disc and the phase of the counter profile, reset the phase of the counter profile to match a phase corresponding to the determined number of cycles of the write clock.

2. The system of claim 1, wherein:
   the position detection module is configured to generate a first timestamp based on a first position indicator of the plurality of position indicators and a second timestamp based on a second position indicator of the plurality of position indicators; and
   the write clock adjustment module is configured to determine the number of cycles of the write clock that occur between the first position indicator and the second position indicator based on the first timestamp and the second timestamp.

3. The system of claim 1, wherein the position detection module is configured to count the number of cycles of the write clock that occur between the consecutive position indicators.

4. The system of claim 1, wherein the position detection module is configured to store a value corresponding to a number of the position indicators associated with the label side of the optical disc.

5. The system of claim 1, wherein the write clock adjustment module is configured to generate a frequency correction control signal based on the difference.

6. The system of claim 1, further comprising a write clock generation module configured to generate the write clock based on the difference.

7. The system of claim 1, further comprising a write control module configured to write pixel data to the label side of the optical disc based on the write clock.

8. The system of claim 1, wherein the position detection module is configured to count a number of cycles of the write clock that occur during a revolution of the optical disc, the system further comprising:
a write control module configured to begin writing pixel data to the label side of the optical disc based on the number of cycles of the write clock that occur during a revolution of the optical disc.

9. The system of claim 8, wherein the write control module is configured to begin writing the pixel data based on a comparison between the number of cycles of the write clock that occur during a revolution of the optical disc and a value corresponding to an angle 0 position of the optical disc.

10. The system of claim 1, further comprising a reference generator module configured to generate the desired number of cycles based on a desired number of cycles of the write clock occurring between the consecutive position indicators.

11. The system of claim 1, wherein:
the position detection module is configured to detect at least a first spindle position indicator and a second spindle position indicator; and
the write clock adjustment module is configured to determine a number of cycles of the write clock that occur between the first spindle position indicator and the second spindle position indicator.

12. The system of claim 1, wherein the at least one of the consecutive position indicators includes an index marker indicative of an angle 0 position of the optical disc, and wherein the reference generator module is configured to reset the phase of the counter profile based on the index marker.

13. The system of claim 12, further comprising an acquisition control module configured to determine the angle 0 position based on the index marker.

14. The system of claim 13, further comprising:
a write control module configured to begin writing pixel data to the label side of the optical disc based on the number of cycles of the write clock.

15. The system of claim 14, wherein the acquisition control module is configured to determine a count value corresponding to the angle 0 position.

16. The system of claim 15, wherein the write control module is configured to begin writing the pixel data based on a comparison between the number of cycles of the write clock and the count value corresponding to the angle 0 position.

17. The system of claim 15, wherein the write control module is configured to i) store the count value and ii) begin writing the pixel data when the number of cycles matches the count value.

18. A method, comprising:
detecting consecutive position indicators, wherein the consecutive position indicators include a plurality of position indicators corresponding to i) a label side of an optical disc, and ii) a single rotation of the optical disc;
receiving an indication of each of the consecutive position indicators;
determining a number of cycles of a write clock that occur between the consecutive position indicators;
determining a difference between the number of cycles of the write clock and a desired number of cycles of the write clock, wherein the desired number of cycles of the write clock corresponds to an expected rotational speed of the optical disc;
adjusting, every time an individual one of the consecutive position indicators in the single rotation of the optical disc is received, a frequency of the write clock based on the difference;
incrementing a counter profile to indicate the desired number of cycles of the write clock;
determining a relationship between an angular position of the optical disc and a phase of the counter profile based on the consecutive position indicators; and
based on the relationship between the angular position of the optical disc and the phase of the counter profile, resetting the phase of the counter profile to match a phase corresponding to the determined number of cycles of the write clock.

19. The method of claim 18, further comprising:
generating a first timestamp based on a first position indicator of the plurality of position indicators and a second timestamp based on a second position indicator of the plurality of position indicators;
determining the number of cycles of the write clock that occur between the first position indicator and the second position indicator based on the first timestamp and the second timestamp.

* * * * *